June 6, 1944.　　　O. M. OLSON　　　2,350,519
FLY TRAP
Filed April 21, 1943
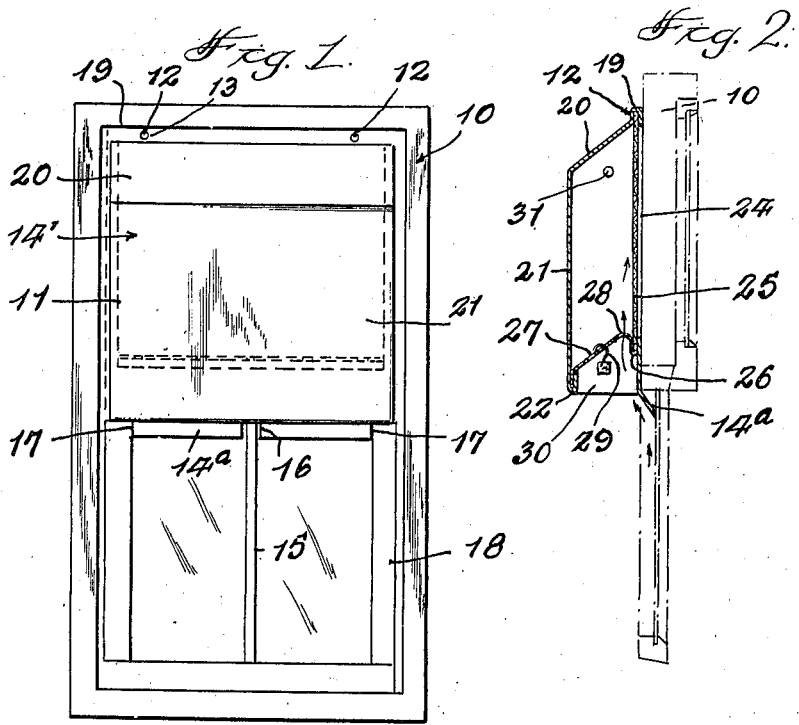
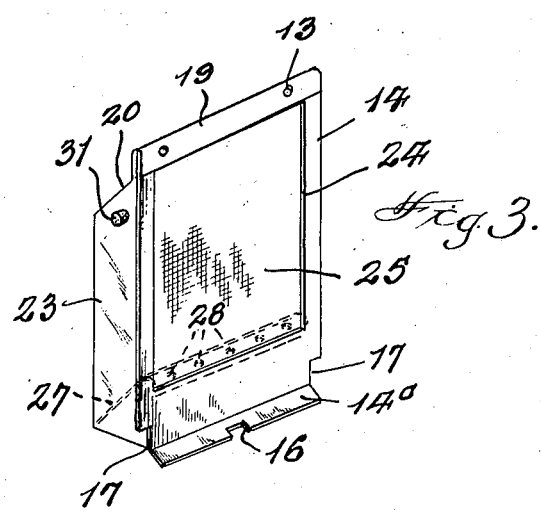
INVENTOR.
Ola M. Olson,
BY Christian R. Nielsen
ATTORNEY.

Patented June 6, 1944

2,350,519

UNITED STATES PATENT OFFICE 2,350,519

FLYTRAP

Ola M. Olson, Rosholt, S. Dak.

Application April 21, 1943, Serial No. 483,943

1 Claim. (Cl. 43—119)

This invention relates to fly traps and it consists in the constructions, arrangements and combinations herein described and claimed.

It is the cardinal object of the invention to provide a fly trap which may be suspended within openings of a building, such as windows and doors, where flies and other insects seek ingress to a building.

More particularly, it is an object of the invention to provide an insect trap which is of extreme simplicity embodying a novel trap-entrance including means for suspension of bait to entice the insects to the trap entrance.

Additional objects, advantages and features of invention will be apparent from the following description and accompanying drawing, wherein Figure 1 is a front elevation of a window having the trap installed.

Figure 2 is a vertical section therethrough, the window being shown by dotted lines.

Figure 3 is a perspective view of the trap.

Reference is first made to Figure 1 of the drawing, where there is shown a window 10, before the upper sash of which there is suspended the trap 11. The trap may be suspended by any suitable means, such as nails 12, which are received in apertures 13 formed in a rear frame piece 14.

The frame 14 is an integral part of a sheet member 14' and is of rectangular form and rests flatly against the window frame as shown in Figure 2, the lower extremity being inclined in the direction of the lower sash of the window so as to rest against the glass pane of the sash, as indicated at 14—a. In certain window frames, a center stile 15 is employed and in order to permit proper positioning of the trap against the pane the lower edge of the frame is cut away, as at 16. The longitudinal edges of the frame piece are cut away as at 17 for accommodation of the vertical stiles 18 of the lower sash.

The sheet member 14' is bent at the upper edge of the frame piece, forming a bight 19 and thence continued downwardly at an inclination forming the top portion 20 of the trap. The front wall 21 of the trap is a downward extension of the roof portion 20, and the lower edge thereof is formed in an upwardly presented bight portion 22. The side walls 23 may be lateral extensions of the sheet material, inwardly bent in the direction of the frame piece 14.

The frame piece 14 is formed with a large opening 24 for the purpose of admitting light into the trap, and has fixed therein a screen 25. In the present instance, the screen is fixed in the bight 19 and a bight 26 formed by the juncture of a bottom wall 27 with the frame piece 14. The other edge of the bottom wall is fixed in the bight 22, which is located at a point lower than the bight 26, thereby positioning the bottom wall at an upward inclination.

A plurality of trap-entrance openings 28 are formed in the bottom wall 27 closely adjacent the screen 25. A hook 29 is suspended from the bottom wall 27 for support of a suitable bait, such as sugar.

In use, flies will light on the window in an attempt to gain entrance into the house, and since it is the tendency of a fly to crawl upwardly, they will encounter the inclined portion 14—a and thus be directed toward the sugar or other bait. After eating on the bait, which is suspended within the well 30 formed by the bottom, front and side walls, the tendency of the fly will be to crawl still further upwardly by reason of attraction to the light through the screened opening 24, by the only posssible entrance through the openings 28. Once the flies enter the trap, it will not be possible for them to get out, since they will not crawl downwardly through the openings 28.

In order that the trap may be emptied, one of the side walls is provided with an opening suitably closed by a stopper 31.

While I have specifically shown and described my trap, this is by way of illustration only, and I consider as my own all such modifications in construction as fairly fall within the scope of the appended claim.

I claim:

A fly trap constructed and adapted to be suspended within a window having a medial vertical stile and side frame stiles, comprising a housing having a wall provided with an inclined portion at its lower end having cut away portions at each vertical edge and at the medial portion thereof whereby to accommodate the vertical and medial stiles of the window and permit the lower edge of the inclined portion to contact the panes of the window, said wall having a screened opening providing light within the housing, said housing further having an inclined bottom wall positioned inwardly of the lower end of the housing forming a well, and said bottom wall having a plurality of entrance-openings formed in advance of said screened opening, and a bait hook suspended from the bottom wall adjacent the entrance openings.

OLA M. OLSON.